(12) United States Patent
Fridrich et al.

(10) Patent No.: US 7,787,030 B2
(45) Date of Patent: *Aug. 31, 2010

(54) METHOD AND APPARATUS FOR IDENTIFYING AN IMAGING DEVICE

(75) Inventors: Jessica Fridrich, Vestal, NY (US); Miroslav Goljan, Vestal, NY (US); Jan Lukas, Johnson City, NY (US)

(73) Assignee: The Research Foundation of State University of New York, Binghamton, NY (US)

( * ) Notice: Subject to any disclaimer, the term of this patent is extended or adjusted under 35 U.S.C. 154(b) by 1047 days.

This patent is subject to a terminal disclaimer.

(21) Appl. No.: 11/305,611

(22) Filed: Dec. 16, 2005

(65) Prior Publication Data

US 2009/0257671 A1 Oct. 15, 2009

(51) Int. Cl.
 *H04N 5/217* (2006.01)
(52) U.S. Cl. .................................................... 348/241
(58) Field of Classification Search ............ 348/207.99, 348/207.1, 207.2, 241, 222.1
 See application file for complete search history.

(56) References Cited

U.S. PATENT DOCUMENTS 6,956,604 B1 * 10/2005 Keupp et al. ............. 348/207.2

OTHER PUBLICATIONS

Lukas, et al., "Determining Digital Image Origin Using Sensor Imperfections".
Lukas, et al., "Digital Bullet Scratches".
Lukas, et al., "Digital Bullet Scratches" for Images.
Lukas, et al., "Digital Camera Identification from Sensor Pattern Noise".
Ng, et al., Blind Detection of Digital Photomontage using Higher Order Statistics; Advent Technical Report #201-2004-1, Columbia University, Jun. 8, 2004.
Popescu, et al., Exposing Digital Forgeries by Detecting Traces of Re-sampling, 53 IEEE Transactions on Signal Processing, Feb. 2005.
Popescu, et al., Exposing Digital Forgeries in Color Filter Array Interpolated Images, 53 IEEE Transaction on Signal Processing, Oct. 2005.
Johnson, et al., Exposing Digital Forgeries by Detecting Inconsistencies in Lighting, Proc. ACM Multimedia and Security Workshop, New York 2005.

(Continued)

*Primary Examiner*—Tuan Ho
(74) *Attorney, Agent, or Firm*—Hoffberg & Associates

(57) ABSTRACT

A new technique for identifying from images a camera, or other imaging device such as a scanner, is based on the device's reference noise pattern, a unique stochastic characteristic of all common digital imaging sensors, including CCD, CMOS (Foveon™ X3), and JFET. First, one determines from images the sensor's reference pattern noise, which uniquely identifies each sensor. To identify the sensor from a given image, the presence or absence of the reference pattern noise in the image under examination is established using a correlation detector or other means.

17 Claims, 3 Drawing Sheets

OTHER PUBLICATIONS

Fridrich, et al., Detection of Copy-Move Forgery in Digital Images, Proc. Digital Forensic Research Workshop, Cleveland, OH, Aug. 2003.

Popescu, et al., Exposing Digital Forgeries by Detecting Duplicated Image Regions, Technical Report, TR2004-515, Dartmouth College, Computer Science 2004.

Kutter, et al., The Watermark Copy Attack, Security and Watermarking of Multimedia Content, vol. 3971, Jan. 2000, San Jose, CA.

Mihcak, et al., Spatially Adaptive Statistical Modeling of Wavelet Image Coefficients and its Application to Denoising.

* cited by examiner

| R | G | R | G | R |
|---|---|---|---|---|
| G | B | G | B | G |
| R | G | R | G | R |
| G | B | G | B | G |

Fig. 2

METHOD AND APPARATUS FOR IDENTIFYING AN IMAGING DEVICE

STATEMENT OF GOVERNMENT INTEREST

This invention was made with Government support under Contract F30602-02-2-0093 awarded by the Air Force. The Government has certain rights in this invention.

BACKGROUND OF THE INVENTION

This invention pertains to identifying an electronic image sensor (e.g., a CCD or CMOS sensor) from an electronic image (i.e., deciding which digital camera or other image-capture device acquired a given electronic image).

A practical and important problem in digital forensics today is to identify reliably the imaging device that acquired a particular electronic image or representation thereof. Techniques to authenticate an electronic image are especially important in court. For example, identifying the source device could establish the origin of images presented as evidence. In a prosecution for child pornography, for example, one could prove that certain imagery was obtained with a specific camera and is thus not an image generated by a computer. As electronic images and digital video replace their analog counterparts, the importance of reliable, inexpensive, and fast identification of the origin of a particular electronic image will only increase.

All prior approaches to identifying the device that acquired a particular image have significant limitations and/or limited reliability. The simplest approach is to inspect the image's electronic file itself for header information, JPEG quantization matrices, etc. However, this information can be easily modified by an attacker, or it may be lost during processing of the image. Another family of approaches either inserts an authentication watermark (Blythe, P. and Fridrich, J.: "Secure Digital Camera," *Digital Forensic Research Workshop*, Baltimore, Aug. 11-13, 2004) into the image or computes an image hash (Canon Data Verification Kit DVK-E2, described at http://www.dpreview.com/news/0401/04012903canondvke2.asp) from the device. Obviously, only images produced by a very limited number of devices can be authenticated this way.

Local pixel defects have also been previously used to identify a particular device (Geradts, Z., Bijhold, J., Kieft, M., Kurosawa, K., Kuroki, K., and Saitoh, N., "Methods for Identification of Images Acquired with Digital Cameras," *Proc. of SPIE, Enabling Technologies for Law Enforcement and Security*, vol. 4232, pp. 505-512, February 2001). However, there are cameras without pixel defects and cameras that remove pixel defects during post-processing of their images. Additionally, pixel defects might not be observable in every scene. This approach is not likely to be applicable to scanners either.

Another proposed prior-art method is classification by feature (Kharrazi, M., Sencar, H. T., and Memon, N.: "Blind Source Camera Identification," *Proc. ICIP '04*, Singapore, Oct. 24-27, 2004). This method is less practical, since it requires a large number of images for training the classifier. Also, the reliability of this method may not rise to the standard required for legal evidence.

Kurosawa's approach (Kurosawa, K., Kuroki, K., and Saitoh, N.: "CCD Fingerprint Method—Identification of a Video Camera from Videotaped Images," *Proc of ICIP '99*, Kobe, Japan, pp. 537-540, October 1999) uses the dark current of video-camera imaging sensors for the purpose of camera identification. The fact that the dark current can only be extracted from dark frames severely limits practical applications of this method. Moreover, because the dark current is a relatively weak signal, the reliability of camera identification based on dark current is limited.

Thus there is a need to identify reliably the imaging device that acquired a particular electronic image with apparatus and method that do not suffer from the drawbacks of the prior art.

OBJECTS AND SUMMARY OF THE INVENTION

In the same manner that bullet scratches allow forensic analysts to match a bullet to a particular gun barrel with reliability high enough to be accepted as legal evidence, the digital equivalent of bullet scratches should allow us to reliably match an electronic image to a sensor. The present invention uses the sensor's pattern noise to reliably identify the device that acquired an image. The present invention can identify the device even from processed images.

The object of the present invention is a simple, reliable, and robust way to identify an image acquisition device, a way that works even for processed images and that can distinguish between sensors from two cameras of the same make and model.

Briefly stated, a new technique for identifying from images a camera, or other imaging device such as a scanner, is based on the device's reference noise pattern, a unique stochastic characteristic of all common digital imaging sensors, including CCD, CMOS (Foveon™ X3), and JFET. First, one determines from images the sensor's reference pattern noise, which uniquely identifies each sensor. To identify the sensor from a given image, the presence or absence of the reference pattern noise in the image under examination is established using a correlation detector or other means.

According to an embodiment of the invention, a method for identifying at least one electronic image sensor from at least one electronic image comprises the steps of: determining from the at least one electronic image sensor a reference noise pattern; searching the at least one electronic image for the reference noise pattern; and identifying presence or absence of the reference noise pattern in the at least one electronic image, whereby presence of the reference noise pattern identifies the at least one electronic image sensor as having acquired the at least one electronic image.

According to a feature of the invention, apparatus for identifying at least one electronic image sensor, e.g., two or more electronic image sensors, from at least one electronic image comprises: means for determining a reference noise pattern from the at least one electronic image sensor; means for searching the at least one electronic image for the reference noise pattern; means for identifying presence or absence of the reference noise pattern in the at least one electronic image, whereby presence of the reference noise pattern identifies the at least one electronic image sensor as having acquired the at least one electronic image. In the case of multiple electronic image sensors, a respective reference noise pattern is determined for each of the electronic image sensors, an electronic image is searched for the respective reference noise patterns; and a presence or absence of the respective reference noise patterns is identified in the electronic image, such that the set of digital imaging sensors which acquired the image pattern can be identified by the presence of the respective reference noise patterns.

According to another feature of the invention, a computer-readable storage medium embodying program instructions for a method of identifying an electronic image sensor from at least one electronic image, the method comprising the steps of: determining from the electronic image sensor a reference noise pattern; searching the at least one electronic image for the reference noise pattern; identifying presence or absence of the reference noise pattern in the at least one electronic image, whereby presence of the reference noise pattern identifies the electronic image sensor as having acquired the at least one electronic image

BRIEF DESCRIPTION OF THE DRAWINGS

FIG. 2 shows a color filter array (CFA) based on the RGB color model.

DETAILED DESCRIPTION OF THE PREFERRED EMBODIMENTS

The completely new approach of the present invention to identify an individual acquisition device from an image makes use of a pattern noise from the imaging sensor (Holst, G. C., *CCD Arrays, Cameras, and Displays*, 2$^{nd}$ edition (JCD Publishing & SPIE Press, USA, 1998)). Slight imperfections in the manufacturing of the imaging sensor and inhomogeneities of silicon wafers cause the pattern noise, which is present in all types of imaging sensors (CCD, CMOS, JFET) currently in use. This pattern noise is automatically and necessarily superimposed on each image the sensor acquires, similar to the process by which a gun barrel imposes specific scratches on a bullet fired from it.

Figure 1:
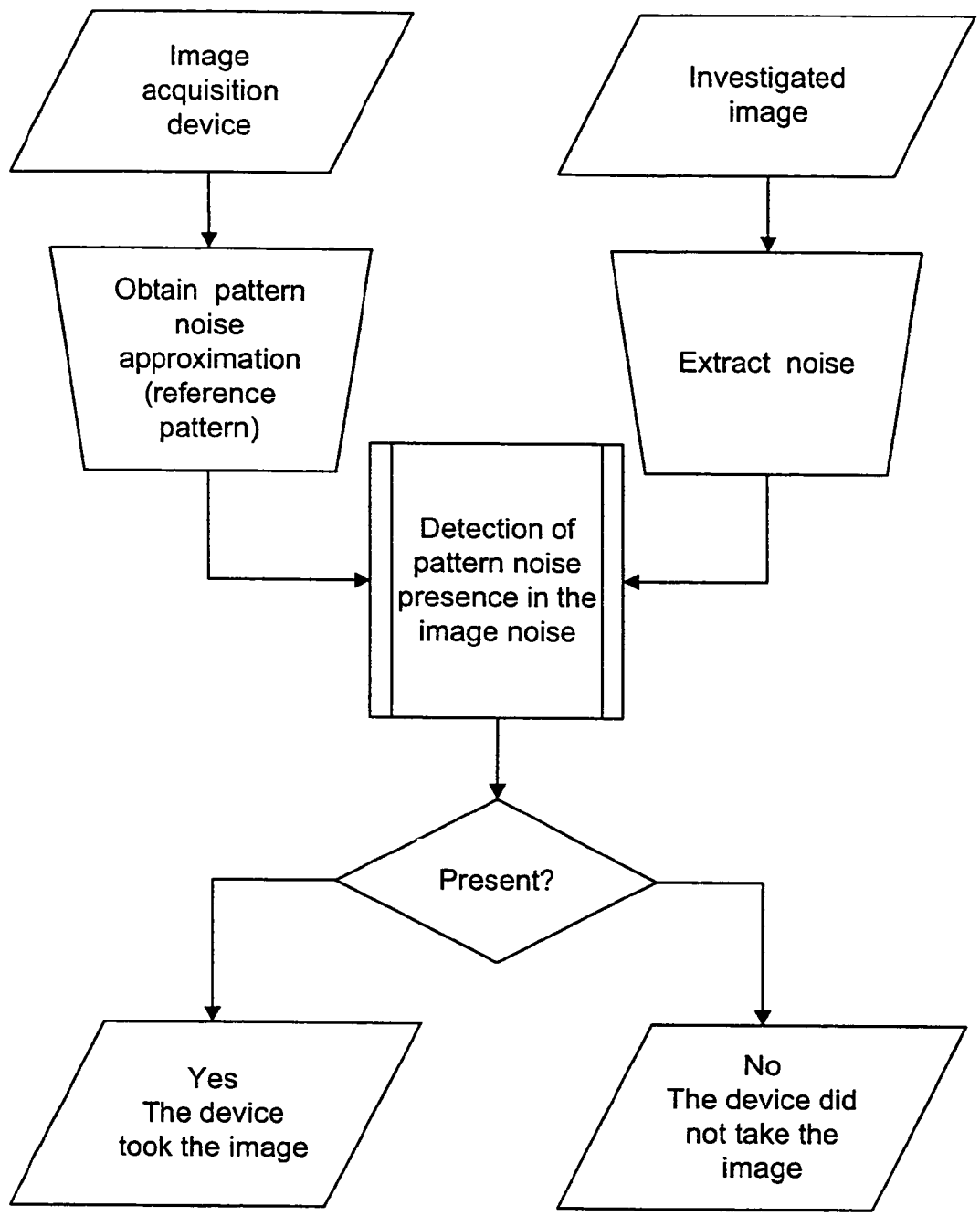
FIG. 1 is a flow chart that illustrates the steps of the present invention.

Referring to FIG. 1, the present invention shows whether or not a particular device acquired a given image. An approximation to its pattern noise (the device's reference pattern noise) is obtained for each suspected device. Ways to do that are presented below at paragraphs [033]-[036]. To detect a similarity between the reference pattern noise and the noise from an investigated image, we first extract the noise from the image. Methods for extracting noise from an image are described below at paragraph [030]. The extracted noise is then correlated with the device's reference pattern noise. The numerical value of the correlation is then compared to the same correlation for other cameras. The numerical values of all correlations are then interpreted to reach a conclusion whether or not a given device acquired the image under investigation and/or which among a group of devices acquired the image. A number of measures other than correlation can be used to compare the image noise with the device's reference pattern; as discussed below at paragraphs [035]-[036].

In a typical digital camera, before the light from the photographed scene reaches a photo-responsive sensor, the light passes through the camera lenses, through an antialiasing (blurring) filter, and then through a color filter array (CFA). The sensor converts photon counts to voltages, which are subsequently quantized in an A/D converter. This digital signal is interpolated (demosaiced) using color interpolation algorithms (if the sensor uses a CFA). The digital signal is then further processed for color correction and white-balance adjustment. Additional processing includes filtering and gamma correction to adjust for the linear response of the imaging sensor. Finally, the resulting electronic image is written to the camera memory device in a format selected by the user. This step of writing may require additional processing, such as JPEG compression.

The imaging sensor is a device that converts light into an electrical signal. Currently, two types of sensors predominate: CCD (charge-coupled devices) and CMOS (complementary metal-oxide semiconductor sensors). CCDs dominate amateur cameras, and they also appear in semi-professional DSLRs. CMOS sensors appear either in low-end cameras, as in cell-phones, or in high-end DSLRs. Also on the market are cameras that use JFET (Junction Field Effect Transistor) sensors (Nikon D2H and D2Hs professional DSLRs) or the Foveon™ X3 sensor (Sigma SD9 and SD10 semi-professional DSLRs); the later is also based on CMOS technology.

Figure 2:
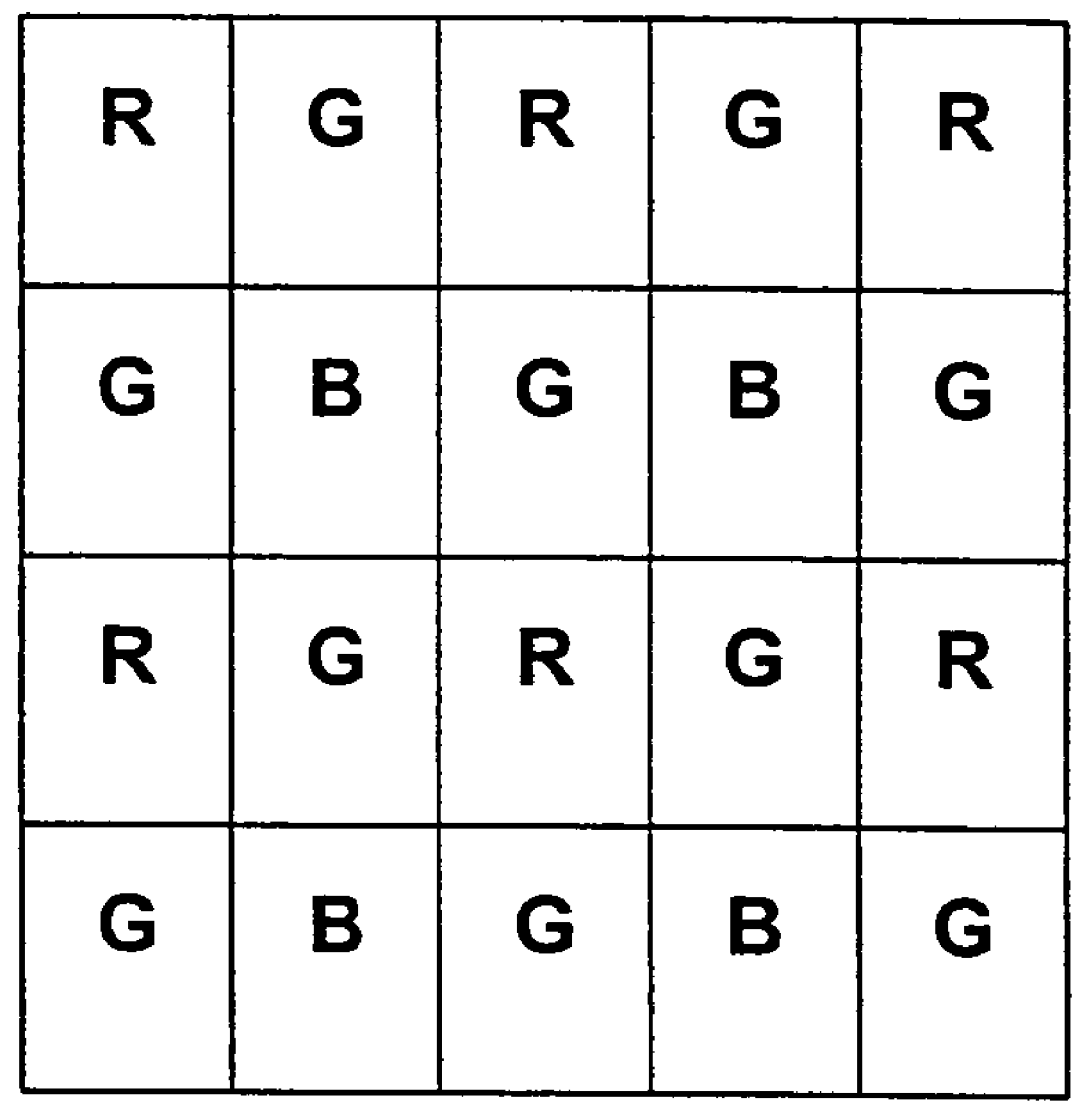

To process the picture, the sensor is divided into minimal addressable picture elements (pixels) that are very small. Pixels collect photons and transform them into voltages. The Foveon™ X3 sensor is the only sensor that is able to capture all three basic colors at every pixel. All other sensors that use CFA capture one basic color at each single pixel. The remaining colors must be interpolated. A number of different interpolation algorithms exist for each CFA. The CFA assigns each pixel its appropriate color to capture. There are many types of CFAs; each is based on a different color model. FIG. 2 shows one common CFA based on the RGB color model.

The pattern noise (also called "pixel noise" or "pixel non-uniformity") is defined (Id.) as the component of noise that is not reduced by frame averaging. Two main components of pattern noise are fixed pattern noise and photo-response non-uniformity noise. Pattern noise may also include some artifacts of processing, e.g., CFA interpolation artifacts. The pattern noise does not change from image to image, and it remains relatively stable over both the life-span of the sensor and a reasonable range of temperature conditions. Thus the pattern noise can identify the device.

There are also random noise components in electronic images that the imaging devices introduce, such as shot noise, dark current shot noise, circuit noise, etc. (Holst, *CCD Arrays*, etc.; Janesick, J. R., *Scientific Charge-Coupled Devices*, SPIE PRESS Monograph vol. PM83 (SPIE—The International Society for Optical Engineering, January, 2001)). As these random components vary from image to image, they are unsuitable for identifying a device.

Assume a scene that is lit absolutely evenly. The resulting electronic image of that scene still exhibits small changes in intensity between individual pixels. This variation in intensity results partly from the random shot noise and partly from the pattern noise, which (as described in para. [023] above) is approximately the same for each image. The imperfections in sensor electronics causing pattern noise are introduced during manufacturing. It is probably impossible to build an imaging sensor that does not exhibit a pattern noise. Semiconductor devices (or microelectronic devices generally) never exactly meet their specifications; rather they come within a given tolerance. In fact, every pixel on the imaging sensor is a semiconductor device with slightly different characteristics from the other pixels. The pattern noise is also influenced by the clock bias (Janesick, *Scientific Charge-Coupled Devices*). The magnitude of the pattern noise is typically of the order of several percent measured by photon transfer, and it varies for different sensors.

The part of the pattern noise caused by dark currents is called the fixed pattern noise (FPN). When no light falls on the sensor, it should not collect any charge. However, dark currents cause electrons to accumulate in pixels, giving rise to a charge. This charge consists of a random part (the dark current shot noise) and a sensor-specific part (FPN). The latter is fixed. The FPN is thus an additive noise that can be corrected for by subtracting dark frame ("Dark Frame Subtraction," Qimage help, http://www.ddisoftware.com/qimage/qimagehlp/dark.htm), a reference frame usually obtained by averaging dark images (lenses covered) obtained with a similar shutter speed and at a similar temperature as the scene image. Denoting the raw scene image as X and the dark frame as D, the FPN correction becomes X←X−D. Some middle to high-end consumer cameras automatically subtract the dark frame, either every time the camera is turned on or when the user activates this function.

The dominant part of the pattern noise is the photoresponse non-uniformity (PRNU) noise. It is caused mainly by non-uniformity of the pixels. The non-uniformity results from imperfections in the sensor; thus the pixels vary in their sensitivity to light. Refraction of the light from dust particles, on optical surfaces, and in the sensor itself are low frequency signals that also contribute to PRNU noise. Because these low-frequency patterns are likely to be time-dependent and influenced by zoom settings, the preferred embodiment of the present invention uses only the high-medium spatial frequency portion of the PRNU noise caused by pixel non-uniformity.

The linear response of sensors enables a simple correction of PRNU using a process called flat-fielding (Hoist, *CCD Arrays*, etc.; Janesick, J. R., *Scientific Charge-Coupled Devices*), in which the image is divided by a normalized reference pattern extracted from a uniformly lit scene. Simple images of uniform blue sky should be sufficient for this purpose (Holst, *CCD Arrays*, etc.). Denoting the flat-fielding frame by F, the noise correction process (including the dark frame subtraction) is expressed as X←(X−D)/F. This processing must be done before any further nonlinear image processing. As noted in Janesick, J. R.: *Scientific Charge-Coupled Devices*, the flat-fielding frame F must be taken under the same conditions as those in which the image X was acquired, including the same focal length of the lens (To properly eliminate even lens vignettage.). Fortunately, most cameras do not flat-field their images, because it is not simple to achieve uniform illumination of the sensor inside the camera. Thus, in the present invention, it is the PRNU noise that identifies the device.

Essentially all imaging sensors (whether CCD, CMOS, JFET, or CMOS-Foveon™ X3) are built from semiconductors, and thus the techniques of their manufacture do not differ significantly. Therefore the pattern noise has similar properties in all these sensors. Although Hoist, *CCD Arrays*, etc., and Janesick, J. R., *Scientific Charge-Coupled Devices*, deal mainly with CCDs, Holst notes (page 92) that CMOS sensors also experience both FPN and PRNU. As JFET sensors do not differ significantly from CMOSs, JFETs should behave similarly. Experiments with the CMOS-Foveon™ X3-based Sigma SD9 confirm the presence of pattern noise that survives frame averaging and thus can identify the device.

To extract the noise from the image, the present invention employs a denoising filter. Let's denote the filter $F_\sigma$. Denoting by Y and $F_\sigma(Y)$ the spatial representation of the image and its denoised version, we work with the difference signal $Y-F_\sigma(Y)$, an approximation to the pattern noise.

There are many image denoising filters. The purpose of the denoising filter is to obtain an approximation to the pixel non-uniformity noise and to remove the influence of the image scene. For the preferred embodiment of the present invention, a general-purpose denoising filter as described in Mihcak M. K., Kozintsev, I., and Ramchandran, K., "Spatially adaptive statistical modeling of wavelet image coefficients and its application to denoising," 6 *Proc. IEEE Int. Conf. Acoustics, Speech, and Signal Processing* (Phoenix, Ariz., March 1999), 3253-3256, is appropriate. This filter extracts from the image a Gaussian noise with known variance $\sigma^2$ (an input parameter to the filter), based on the assumption that, in the wavelet domain, the image and the noise form an additive mixture of a non-stationary Gaussian signal and a stationary Gaussian signal with a known variance $\sigma$. Experiments show that identifying the device that acquired a given image with the present invention is not very sensitive to the filter parameter $\sigma$, as long as $\sigma>1$. The value $\sigma=5$ gives the best overall performance across all devices.

In other embodiments of the present invention, common denoising filters, such as a median filter, can be used, but their performance is likely to be worse.

As suggested in paragraph [019] above, the imaging device's reference pattern noise can be obtained in several different ways. Some of these ways require that the device be available.

In the preferred embodiment, the noise is extracted from multiple images with the denoising filter to eliminate the influence of the scenes imaged and the random noise in the output of the denoising filter. The more images that are used, the more accurate the approximation $P'_C$ to the reference pattern noise $P_C$ of camera C becomes (as shown by Holst, *CCD Arrays*, etc., only the pattern noise survives frame averaging), thus enabling a more reliable identification. We recommend using about 300 images of natural scenes if they are available. About 50 images is the recommended minimum for reliable results. Note that this embodiment does not require the device to be available—only images from the device, either raw or compressed, are necessary. Averaging the approximated pattern noise from the images yields the device's reference pattern noise. This embodiment is applicable to all cameras and other devices that acquire images, such as video-cameras and scanners.

A second embodiment of the present invention for calculating the reference pattern noise uses dark frame subtraction and flat fielding (Holst, *CCD Arrays*, etc., and Janesick, J. R., *Scientific Charge-Coupled Devices*). Both actions must be performed on the raw sensor data before demosaicing and other in-camera processing. Most consumer cameras, however, do not provide an option to output this raw data and, even if they do, the image under inspection will most likely be available only as JPEG or some other raster format, such as TIFF.

Other embodiments of the present invention exist to obtain the device's reference pattern. For example, one can extract the noise from a single blue-sky image to obtain the device reference pattern. In this embodiment, performance is likely to worsen significantly.

Generally, any mathematical tool that can measure (or estimate) the closeness between the device's reference pattern and the image noise can determine whether the image noise is compatible with a given imaging device reference pattern. Correlation determines how much the image noise is compatible with a given imaging device reference pattern. The correlation $\rho_C$ between the image noise $Y-F_\sigma(Y)$ and the approximation to the device's reference noise pattern $P'_C$ is calculated according to the following formula:

$$\rho_c(Y) = \text{corr}(Y - F_\sigma(Y), (P'_c)) = \frac{(Y - F_\sigma(Y) - E\{Y - F_\sigma(Y)\}) \cdot (P'_c - E\{P'_c\})}{\|Y - F_\sigma(Y) - E\{Y - F_\sigma(Y)\}\| \|P'_c - E\{P'_c\}\|}, \quad (1)$$

where $E\{x\}$ stands for the mean value of x and $\|x\|$ for the $L_2$ norm (or the square root of the sum of the squares) of x. The value is then compared to the average correlation $\overline{\rho_c}'$ obtained for images taken by the same device under the same or similar conditions. When examining other imaging devices, the correlation is computed for each reference noise pattern. The highest correlation value $\overline{\rho_c}^t$ determines the device that acquired the image Y. Furthermore, statistical analysis of the experimental data together with optimal decision-making, e.g., the Neyman-Pearson approach (Hoel, P. G., Port, S. C., and Stone, C. J. "Testing Hypotheses," Chapter 3 in *Introduction to Statistical Theory* (NY, Houghton Mifflin, 1971), pp. 56-67), may be used to calculate thresholds that give required false alarm rate (FAR) and false rejection rate (FRR).

The technique of the present invention is easy to implement, works for every digital imaging sensor, and is very robust to degradation of the image by, e.g., lossy (usually JPEG) compression, common image processing, down sampling (resizing), or any combination of them. Resampling must be corrected for because it desynchronizes the device reference pattern noise from the image noise.

Figure 3:
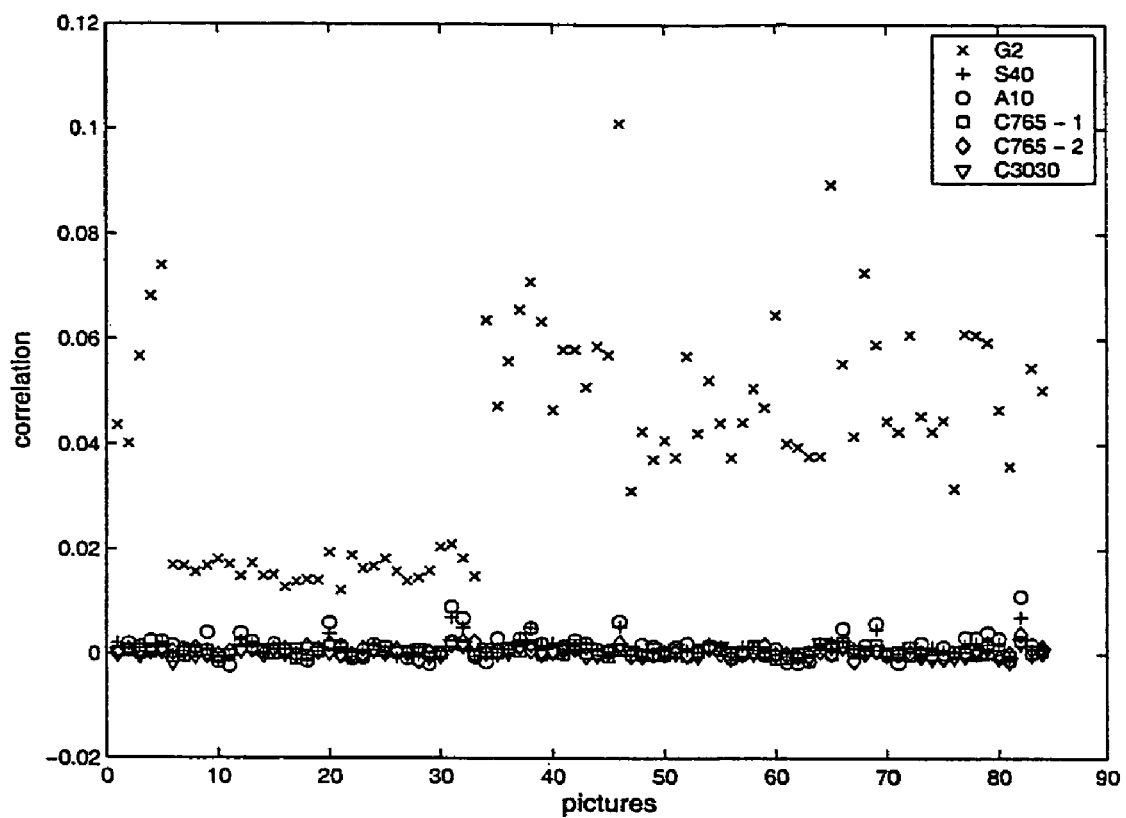
FIG. 3 shows the performance of the method of identification of the present invention.

FIG. 3 illustrates the performance of the technique of identification of the present invention. Given a set of low-resolution 1600×1200 JPEG images, including low quality JPEGs, the task was to determine the digital camera that acquired the images from among six (6) different cameras (one each of Canon A10, G2, and S40, two Olympus C765, and Olympus C3030). The reference pattern for each camera was computed by noise averaging using approximately 300 full-camera resolution images of the highest possible quality (2272×1704 TIFF images for Canon G2 and S40, 1280×960 JPEG images for Canon A10, 2288×1712 TIFF images for Olympus C765, and 2048×1536 JPEG images for Olympus C3030).

From each tested image, the noise was extracted with the denoising filter described above in paragraph [031]. To compute the correlation, the noise was bilinearly upsampled to the dimensions of each reference pattern. The correlation values for each image are plotted in FIG. 3. Examination of the figure shows that, according to the highest value of $\rho_C$, the Canon G2 camera was always correctly identified as the source camera.

Reliable identification is possible even from images that were resampled, JPEG-compressed, and then gamma-corrected. However, geometrical transformations of images, such as rotation, cropping, resizing, continuous digital zoom, or fish-eye lens processing are major complications for the technique of the present invention, as it obviously requires proper synchronization between the image noise and the device reference pattern noise. These transformations cause desynchronization, so they must be corrected for prior to calculating the correlation. Such correction may require a search or applying methods to detect resampling, similar to the approaches described in Popescu, A. C. and Farid H., "Statistical Tools for Digital Forensic," in J. Fridrich (ed.), 3200 *6th International Workshop on Information Hiding, LNCS*, 128-147 (Springer-Verlag, 2004); Popescu A. C. and Farid H., "Exposing Digital Forgeries in Color Filter Array Interpolated Images," *IEEE Transactions on Signal Processing*, 2005 (in press), the disclosures of which are hereby incorporated by reference.

Another important question is whether the technique of the present invention can be fooled by an attacker and, if so, how easily. While a simple denoising of the image with a denoising filter is not enough to remove the pattern noise, it is known from robust watermarking (Cox, I., Miller, M. L., and Bloom, J. A., *Digital Watermarking* (San Francisco, Morgan Kaufmann, 2001) that an attacker who knows the watermark is capable of removing it or planting it in a different image (the watermark copy attack; see Kutter, M., Voloshynovskiy, S., and Herrigel, A., "The Watermark Copy Attack," 3971 *Proc. SPIE Electronic Imaging, Security and Watermarking of Multimedia Content II*, 371-380, San Jose, Calif., 2000).

Malicious manipulation that will fool the identification algorithm is, indeed, possible if the attacker possesses enough skill in signal processing. In fact, any identification method one can devise can be compromised by a sufficiently sophisticated opponent. This problem does not, however, diminish the importance of the present invention. Despite the fact that it is certainly possible to forge mechanical scratches on a bullet, this analog identification technique is widely used in court.

A test of the invention on nine (9) different digital cameras, including two of exactly the same model and one with CMOS sensor, correctly matched each of several thousand images to the correct camera without a single misclassification.

What is claimed is:

1. A method for identifying an electronic image sensor from at least one electronic image comprising the steps of:
   determining from said electronic image sensor a reference noise pattern
   searching said at least one electronic image for said reference noise pattern; and
   identifying presence or absence of said reference noise pattern in said at least one electronic image, whereby presence of said reference noise pattern identifies said electronic image sensor as having acquired said at least one electronic image,
   wherein said determining:
   makes use of dark frame subtraction and flat fielding,
   employs a plurality of electronic images, or
   comprises a step of denoising said at least one electronic image with a denoising filter.

2. The method of claim 1, wherein said step of searching makes use of a correlation detector.

3. The method of claim 1, wherein said step of determining employs a plurality of electronic images.

4. The method of claim 1, wherein said step of determining comprises a step of denoising said at least one electronic image with a denoising filter.

5. The method of claim 4, wherein said step of denoising extracts from said at least one electronic image a Gaussian noise with known variance $\sigma^2$ and $\sigma>1$.

6. The method of claim 4, wherein said step of denoising extracts from said at least one electronic image a Gaussian noise with known variance $\sigma^2$ and $\sigma=5$.

7. The method of claim 2, wherein a correlation $\rho_c$ between image noise Y-F$\sigma$(Y) and said reference noise pattern $P_c$ is calculated by the formula:

$$\rho_c(Y) = \mathrm{corr}(Y - F_\sigma(Y), (P_c) = \frac{(Y - F_\sigma(Y) - E\{Y - F_\sigma(Y)\}) \cdot (P_c - E\{P_c\})}{\|Y - F_\sigma(Y) - E\{Y - F_\sigma(Y)\}\| \|P_c - E\{P_c\}\|}.$$

8. The method of claim 1, wherein said step of determining is applied to said electronic image sensor that is based on semiconductor technology.

9. The method of claim 1, wherein said step of determining is applied to said digital imaging sensor that comprises at least one of a CCD, CMOS, and JFET sensor.

10. Apparatus for identifying at least one electronic image sensor from at least one electronic image comprising:
    means for determining a reference noise pattern from said at least one electronic image sensor;
    means for searching said at least one electronic image for said reference noise pattern;

means for identifying presence or absence of said reference noise pattern in said at least one electronic image, whereby presence of said reference noise pattern identifies said at least one electronic image sensor as having acquired said at least one electronic image, wherein said means for determining comprises a denoising filter, said means for searching comprises a correlation detector, or said means for searching further comprises means for applying dark frame subtraction and flat fielding.

11. Apparatus as in claim 10, wherein said means for determining comprises a denoising filter.

12. Apparatus as in claim 10, wherein said means for searching comprises a correlation detector.

13. Apparatus as in claim 12, wherein said correlation detector calculates a correlation $\rho_c$ between image noise $Y - F\sigma(Y)$ and said reference noise pattern $P_c$ according to the formula:

$$\rho_c(Y) = \text{corr}(Y - F_\sigma(Y), (P_c) = \frac{(Y - F_\sigma(Y) - E\{Y - F_\sigma(Y)\}) \cdot (P_c - E\{P_c\})}{\|Y - F_\sigma(Y) - E\{Y - F_\sigma(y)\}\| \|P_c - E\{P_c\}\|}.$$

14. Apparatus as in claim 10, wherein said electronic image sensor is based on semiconductor technology.

15. Apparatus as in claim 10, wherein said at least one digital imaging sensor is a one of a CCD, CMOS, and JFET sensor.

16. Apparatus as in claim 10, wherein said at least one digital imaging sensor functions as an integral part of a one of a scanner, a digital videocamera, and a digital still camera.

17. Apparatus as in claim 10, wherein:

said at least one digital imaging sensor comprises at least two digital imaging sensors adapted to together produce an electronic image;

said determining means determining a respective reference noise pattern from each of said electronic image sensors;

said searching means searching said at least one electronic image for said respective reference noise patterns; and said identifying means identifying presence or absence of said respective reference noise patterns in said at least one electronic image, whereby presence of said respective reference noise patterns identifies said set of at least two digital imaging sensors as having acquired said at least one electronic image.

\* \* \* \* \*